Patented Sept. 28, 1943

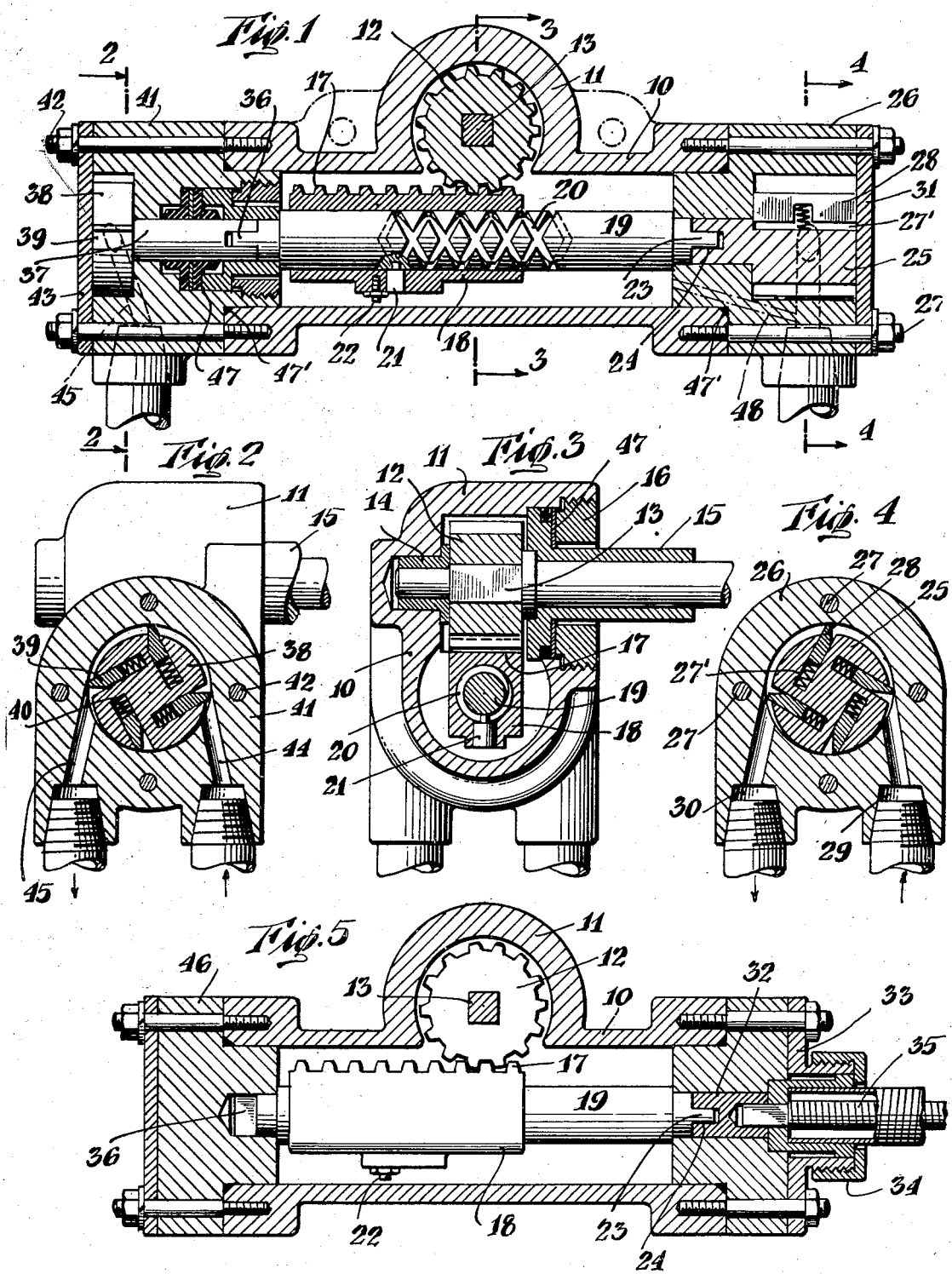

2,330,486

UNITED STATES PATENT OFFICE 2,330,486

DRIVE MECHANISM

Ernest W. Fuller, Shaker Heights, Ohio, assignor to The Acrotorque Company, Cleveland, Ohio, a corporation of Connecticut Application February 18, 1941, Serial No. 379,538

4 Claims. (Cl. 15—250.4)

This invention relates to a structurally and functionally improved drive mechanism and in its more specific aspect aims to provide a unit, primarily in the nature of a motor and which may be employed, for example, for the purpose of driving a windshield wiper mechanism.

An object of the invention is that of furnishing a structure of this nature and which will be compact, while at the same time it will develop a relatively great amount of power. Accordingly, while the mechanism may be employed in various associations, it may be utilized to advantage in aircraft installations for the purpose of cleaning the windshield or other surfaces of an airplane.

A further object is that of providing a mechanism of this character which may conveniently employ fluid under pressure for its operating medium, and in which moreover but a relatively small amount of fluid will be necessary to insure proper operation. Thus, the mechanism may conveniently be coupled to one of the fluid pressure systems as presently existing in aircraft; and when so installed will operate over long periods of time with freedom from all difficulties.

Another object is that of furnishing a drive mechanism and by means of which fluid, such as, alcohol may be distributed. Accordingly, if the unit is employed for the purposes of cleaning a windshield, it is apparent that this fluid may simultaneously be distributed by the mechanism for the purpose of de-icing the surface which is to be cleaned.

Another object is that of furnishing a drive mechanism which will embody relatively few parts, each individually simple and rugged in construction, these parts being largely capable of quantity production methods and ready assemblage.

With these and other objects in mind, reference is had to the attached sheet of drawings illustrating practical embodiments of the invention and in which:

Fig. 1 is a sectional front view taken through the drive mechanism;

Figs. 2, 3 and 4 are transverse sectional views taken respectively along the lines 2—2, 3—3 and 4—4 and in the direction of the arrows as indicated in Fig. 1; and Fig. 5 is a view similar to Fig. 1 but showing the parts of the mechanism arranged in a slightly different manner than in the first figure.

Referring primarily to Figs. 1 to 4, it will be seen that the numeral 10 indicates a housing formed with a central extension 11 within which a pinion 12 may be disposed. The latter is mounted upon a shaft 13 which as shown in Fig. 3 may have one of its ends mounted in a bearing 14, its opposite ends extending through a sleeve 15 secured in position by a nut 16 mounted by the housing 10.

The teeth of pinion 12 are engaged by a rack 17. This rack forms a part of a sleeve 18 which encircles a shaft 19. As illustrated, especially in Fig. 3, the teeth of the rack and pinion have widths such that the sleeve will not rotate with the shaft 19 but rather will be limited to movement in a straight path incident to the meshing of these teeth.

Shaft 19 is formed with a pair of spirally extending grooves 20, the ends of which are coupled so that an endless worm-feed is presented and in which, the convolutions of the left hand worm or groove intersect the similar convolutions of the right hand groove or channel. A pin 21 is mounted by a sleeve 18 and extends into the groove 20. This pin may be locked in position, as for example, by a stud 22 and so that, while it is capable of at least limited rotation, it will not move outwardly of the sleeve 18.

Now with a view to rotating shaft 19, it will be observed that the end of the same may be in the form of a coupling 23. As shown in Fig. 1, this coupling portion may be engaged by a corresponding portion 24 which forms a part of the shaft of a rotor 25. The latter may be disposed within a housing 26 secured to body 10 by bolts 27. As especially shown in Fig. 4, the rotor is formed with a plurality of tangentially extending recesses within which vanes 28 are disposed. The latter have a lap-fit and are preferably spring pressed as indicated at 27'. The housing 26 is formed with an inlet passage 29 and an outlet 30, and has applied to it a cover 31 against the inner face of which, the rotor may have bearing.

It follows that with fluid under pressure flowing into channel 29, the rotor will turn. Incident to the springs 27', the edges of the vanes will move toward sealing contact with the face of the housing 26. The higher the speed of rotation of the rotor 25, the greater will be the centrifugal force acting on these vanes to thus, enhance this sealing action. Incident to the turning of the rotor, shaft 19 will turn. Pin 21 traversing the groove or channel 20, will cause the sleeve 18 and rack member 17 to be reciprocated. This reciprocation, will in turn result, in oscillation on the part of pinion 12 and a corresponding movement on the part of shaft 13.

While it is preferred according to certain aspects of the present invention to employ a motor assembly as just described and for the purpose of rotating the shaft 19 or its equivalent, it is apparent that various other forms of driving mechanism might be utilized. In fact, as shown in Fig. 5, a remote drive might be employed. In this figure, it is to be observed that a coupling 32 engages with the coupling portion 23 of the shaft 19. The coupling 32 may, by means of a coverplate 33 and a cap member 34, be maintained in proper position. A flexible shaft 35 may be secured to this coupling and the end of this flexible shaft may be connected to any desired source of motive power. Obviously, a turning of the shaft 35 results in a corresponding movement on the part of the couplings 32 and the shaft 19.

Now returning to a consideration of Figs. 1 and 2, it will be observed that the opposite end of shaft 19 may likewise terminate in a coupling 36 corresponding to the coupling 23. This coupling 36 is connected to a shaft 37 which forms a part of a rotor 38. Similarly to the rotor 25, a plurality of tangentially extending slots are formed in this latter rotor and these receive vanes 39 which may be spring pressed as indicated at 40. The vanes 39 also have a lap-fit and this entire assembly is enclosed in a housing portion 41 which is maintained in position by means of bolts 42. The latter also maintain a coverplate 43 in position. Leading to the rotor chamber within the housing 41, is an inlet passage 44 and an outlet 45.

It will be obvious that passage 44 might be connected to a source of liquid supply, such as, an alcohol reservoir (not shown). In any event, with shaft 19 rotating, the rotor 38 will be impelled to cause the vanes 39 to discharge the liquid through channel 45. Thence, it may be distributed to or adjacent the blade or blades which are being oscillated by the shaft 13. Before departing from a consideration of this structure, it will be apparent that with the bolts 27 and 42 or other securing means suitably disposed with respect to the housing 26 and 41, the latter may be shifted or rotated with respect to the body 10. This is important in installation technique, in that it will obviously permit the fittings or units extending from passages 29 and 30, 44 and 45 to project in any desired direction with respect to the body 10.

Under certain operating conditions, it is apparent that the pump structure as just described might be dispensed with. In such a case and as shown in Fig. 5, the housing 41 may be removed and a body 46 substituted therefor. This body would provide a bearing portion for the shaft 19 and might be secured in position by the same bolts 42 which would normally retain the housing. Under certain circumstances, and regardless of whether the driving motor for the shaft 19 were disposed in immediate proximity to the body 10 or remote therefrom, the parts would operate in the manner heretofore described, excepting only that no liquid distributing structure would be present.

As heretofore traversed, it is obvious that with the shaft rotating, the rack 17 will reciprocate to cause the desired operation on the part of shaft 13.

Similarly to the motor structure including the vanes 28, the vanes 39 of the pump will be shifted outwardly with increasing force as the parts rotate at the desired speed. The faster the rotation of shaft 19, the greater amount of liquid distributed by the pump. Thus, this speed will be proportional to the speed of operation of the shaft 13 and the parts associated therewith. Conversely and as afore described, this pump structure may be completely eliminated without any interference to the operating principles herein involved. In any event, it will be observed that if a hydraulic motor is employed and if such motor is associated with body 10, the interior of the latter may have communication with the outlet channel 30 by means of a passage 48 which will permit of the flow of a certain amount of liquid into this space to thus assure of lubrication of the parts.

In conclusion, it will be noted that packing 47 may be provided at any number of desired points and which packing may include rubber bodies or else bodies which are resistant to the action of oil and so that, there will be no danger of leakage occurring.

From the foregoing, it will be appreciated that among others, the several objects of the invention as specifically afore noted are achieved. Obviously, numerous changes in construction and rearrangements of the parts might be resorted to without departing from the spirit of the invention as defined by the claims.

I claim:

1. A windshield wiper mechanism for cleaning and delivering liquid to a windshield comprising a central shaft housing, a rotatable motion changing shaft mounted therein, rotary reciprocating windshield wiper means operatively connected with said shaft, a motor housing secured to one end of said central housing, means in said housing for cooperating with and driving said shaft, a pump housing secured to the other end of said central housing, liquid pump means in said housing and driven by said shaft and means for delivering liquid from said pump to said windshield.

2. A windshield wiper mechanism for cleaning and delivering liquid to a windshield comprising a central shaft housing, a rotatable motion changing shaft mounted therein, rotary reciprocating windshield wiper means operatively connected with said shaft, a motor housing secured to one end of said central housing, liquid inlet and outlet openings formed in said housing, liquid motor means associated with said housing for cooperating with and driving said shaft, a pump housing secured to the other end of said central housing, liquid inlet and outlet openings forming a part of said housing, liquid pump means in said housing and driven by said shaft, means for delivering liquid from said pump to said windshield and means to secure said pump housing to said central housing in a plurality of selected positions whereby varying positions of said inlet and outlet openings may be obtained.

3. A windshield wiper mechanism for cleaning and delivering liquid to a windshield comprising a central shaft housing, a rotatable shaft mounted therein and providing a pair of oppositely extending, spirally disposed trackways, shaft encircling means, teeth forming a part of said means whereby upon rotation of said teeth will be reciprocated, a pinion having its teeth in mesh with the teeth of said shaft encircling means and preventing rotation of the latter, windshield wiper means operatively connected with said pinion, a motor housing secured to one end of said central housing, means in said housing for cooperating with and driving said shaft, a pump housing secured to the other end of said central housing and driven by said shaft, pump means in said housing and means for delivering liquid from said pump to said windshield.

4. A windshield wiper mechanism for cleaning and delivering liquid to a windshield comprising a central motion changing shaft housing, a rotatable shaft mounted therein and provided with a pair of oppositely extending, spirally disposed trackways, a rack mounted upon and connected to said shaft to be reciprocated in response to rotation of said shaft, a pinion having its teeth in engagement with the teeth of said rack, windshield wiper means operatively connected with said pinion, a motor housing secured to one end of said central housing, motor means within said motor housing for cooperating with and driving said shaft, a pump housing connected to the other end of said central housing, and provided with liquid inlet and outlet openings, liquid pump means in said housing and driven by said shaft, means for delivering liquid from said pump to said windshield, selective engaging means on said central housing and said pump housing and means cooperating with said engaging means to selectively secure the pump housing to the central housing in one of a plurality of selected positions.

ERNEST W. FULLER.